Aug. 13, 1929.  J. O. CARREY  1,724,125
SEAL
Filed May 25, 1925
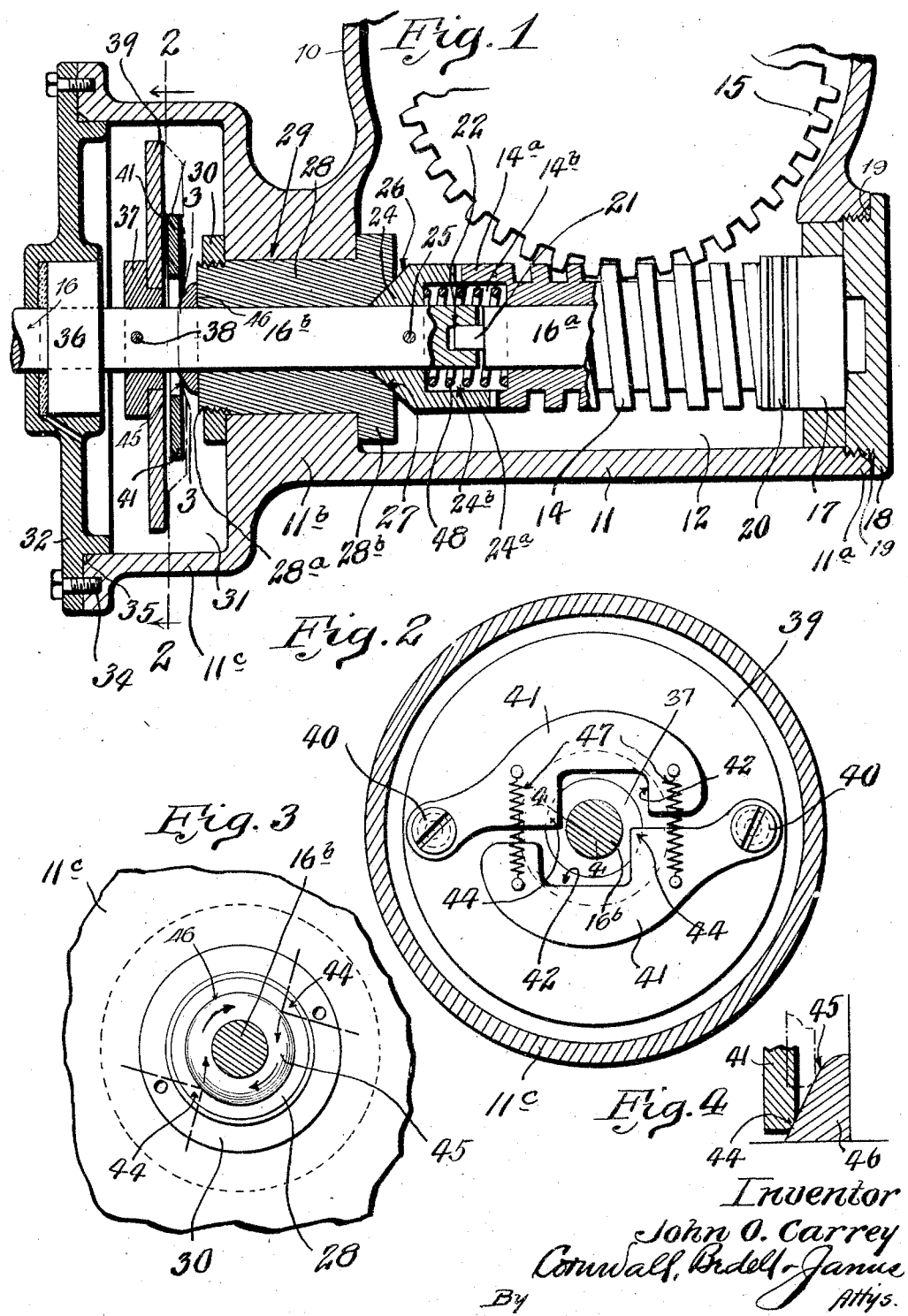
Inventor
John O. Carrey
Cornwall, Burdell & Janue
By  Attys.

Patented Aug. 13, 1929.

1,724,125

UNITED STATES PATENT OFFICE.

JOHN O. CARREY, OF ST. LOUIS, MISSOURI, ASSIGNOR TO CARREY-MORSE ENGINEERING COMPANY, OF ST. LOUIS, MISSOURI, A CORPORATION OF MISSOURI.

SEAL.

Application filed May 25, 1925. Serial No. 32,675.

This invention relates to fluid pressure machines and more specifically to seals therefor.

In the operation of fluid pressure machines, such as compressors for refrigeration systems, the fluid pressure created in such systems has a tendency to force oil and the refrigerating medium outwardly through various joints if these are not effectually sealed. This is particularly true of the shaft opening of the compressor. Such leakage causes loss of oil or the refrigerating medium and renders the refrigerating apparatus unfit for use in places where it is undersirable to have oil dripping from the machine or the refrigerating fluid escaping into the atmosphere and contaminating the rooms in which it is located. A great deal of trouble has been experienced in providing a seal for the operating shaft which would be efficient both during the operation of the machine and when stationary. When the machine is stationary, the pressure in said machine is increased due to the expansion of the refrigerating medium therein and this rise of the pressure above normal causes the gas or oil to escape through the shaft bearing. It has been found that to take care of this increased pressure it was necessary to pack and seal the shaft to such an extent that an undesirable and extensive amount of friction was produced when the machine was set in operation, thereby causing loss of power and impairing the efficiency of the machine.

It is the purpose of this invention to provide a seal which will be placed under increased contact or sealing pressure when the machine is stationary, thereby taking care of the increase of fluid pressure in the system, which sealing fluid pressure will be reduced to normal during the operation of the machine so as not to create unnecessary friction and retard the operation thereof.

Further objects of the invention are to provide means operable in correlation with said machine for controlling said seal to increase or reduce the sealing pressure in accordance with the operating conditions of the machine.

With these and other objects in view, my invention consists in certain novel features of construction and arrangement of parts, hereinafter more fully described and claimed and illustrated in the accompanying drawings, in which—

Figure 1 is a longitudinal section taken vertically through the seal housing and showing the lower portion of the compressor casing and its driving connections.

Figure 2 is a vertical cross section taken on line 2—2 of Figure 1 and looking in the direction indicated by the arrows.

Figure 3 is a similar cross section looking in the opposite direction.

Figure 4 is an enlarged cross section taken on line 4—4 of Figure 2.

Referring by numerals to the accompanying drawings, 10 indicates a housing of the compressor, formed integral with which is a tubular casing 11 having a bore 12 for receiving a worm 14 which is adapted to drive worm gear 15 of the compressor actuating mechanism.

Worm 14 is loosely arranged on a section $16^a$ of a shaft 16, one end of which section $16^a$ is arranged in a bearing 17, which latter is disposed in the outer end $11^a$ of tubular casing 11. This end $11^a$ is closed by a plate 18 which is screw-seated therein, there being suitable packing 19, preferably of lead, provided to seal the joint between member 18 and end $11^a$. A thrust bearing 20 is interposed between bearing 17 and one end of worm 14 to take care of the end thrust. The opposite end of shaft section $16^a$ terminates in a reduced portion 21 which is received in a seat 22 formed in the corresponding end of shaft section $16^b$, thereby permitting longitudinal movement of said shaft sections relative to each other. A collar 24 is fixed to shaft section $16^b$, preferably by a pin 25, and is provided with a bearing face 26 which is adapted to cooperate with a bearing face or seat 27 formed in a bearing 28. Member or collar 24 is provided with annularly disposed teeth or lugs $24^a$ which interengage lugs or teeth $14^a$ formed on the adjacent end of worm 14, whereby operating connection is established between the driving shaft section $16^b$ and worm 14. This bearing is disposed in a bore 29 formed in the opposite end $11^b$ of tubular casing 11 and has its extreme end projecting therethrough and threaded as indicated at $28^a$ for receiving a collar 30 which, when drawn against end $11^b$, clamps bearing 28 in position, the opposite end of said bearing having an annular shoulder $28^b$ for abutting the corresponding wall of portion $11^b$.

This portion carries a cylindrical extention 11ᶜ which is preferably formed integral therewith and provides a chamber 31 for enclosing collar 30 and the projecting end of bearing 28. This cylindrical extension is closed by a plate 32 which is secured in position thereon by bolts or other fastening devices 34 and the joint between which is sealed by a suitable packing 35.

A bearing 36 is disposed in plate 32 to provide bearing for shaft section 16ᵇ which extends therethrough and is driven in any suitable manner. A collar 37 is fixed to shaft 16ᵇ, preferably by a pin 38, and carried by said collar 37 is a circular plate 39 on which are pivotally mounted as at 40 weighted arms 41, the inner edges of which are cut away as indicated at 42 to provide clearance for shaft section 16ᵇ and which are provided with bearing portions 44 which are adapted to engage the beveled face 45 of a collar 46, which latter is loosely disposed on shaft 16ᵇ between collar 37 and bearing 28 and has its flat face in abutting contact with the projecting threaded end 28ᶜ of said bearing.

A pair of springs 47 have their ends secured to the respective arms 41 and tend to maintain said arms in their inward or contracted positions.

The cone-shaped or beveled face 26 of member 24 is yieldingly held against face 27 of bearing 28 by a coiled spring 48 which is interposed between worm 14 and member 24 and is preferably disposed in recesses 14ᵇ of member 14 and 24ᵇ of member 24.

When the machine is in operation, shaft 16 is rotated and arms 41 are moved outwardly by centrifugal action away from collar 46 and the sealing joint between the contacting faces 26 and 27 is maintained by spring 48, the tension of which is sufficient to provide an efficient seal but is not excessive so as to unnecessarily increase the friction between said faces and impair the efficiency of the machine.

When the machine is at a standstill, arms 41 are drawn inwardly by springs 47, thereby causing the operating faces 44 of said arms to engage the beveled face 45 of loose collar 46. This action imparts a slight longitudinal movement to shaft section 16ᵇ due to the wedging movement of portions 44 which are carried by said shaft section and engage the inclined face of collar 46 which is held against longitudinal movement by bearing 28. The longitudinal movement of section 16ᵇ forces the face 26 of member 24 against the face 27 of bearing 28, thereby forming a tight joint or seal, thus preventing leakage of oil from the compressor housing.

The points of engagement between the arms 41 and washer 46 are tangentially disposed relative to the axis of said washer so that when said arms are brought in contact with washer 46, the latter has imparted thereto a rotary motion, thereby reducing the resistance offered to arms 41 during their inward movement so that comparatively light springs 47 are required. As soon as shaft 16 is actuated, arms 41 fly outwardly, thereby permitting shaft section 16ᵇ to move inwardly a slight distance so as to remove the excessive friction between the sealing faces of bearing 28 and member 24. In this manner the contacting faces 27 and 26 are held under normal sealing pressure during the operation of the machine, which pressure is sufficient to prevent the escape of oil past the shaft and when the latter is stationary this sealing pressure between the contacting faces is increased by the cooperation of arms 41 with collar 46 to compensate for the increase of fluid pressure produced in the compressor by the expansion of the refrigerating medium.

I claim:

1. A seal comprising a sectional shaft, one of said sections being movable longitudinally, a stationary member forming a bearing for said shaft, a rotatable member fixed to said shaft and in sealing engagement with said stationary member, and a centrifugally controlled device for displacing said movable shaft section, said device being spring-actuated in one direction to provide auxiliary sealing pressure between said members when said shaft is stationary and centrifugally actuated to remove this auxiliary pressure when said shaft attains predetermined speed.

2. A seal for compressors comprising a stationary member provided with a seat, a shaft having a bearing in said stationary member and movable longitudinally relative thereto, a rotatable member carried by said shaft and in sealing engagement with said stationary member, a collar abutting said stationary member, and centrifugally operable arms carried by said shaft and engaging when in retracted position said collar for moving said shaft longitudinally to bring said stationary member in close sealing contact with said rotatable member.

3. A seal for compressors comprising a stationary member provided with a seat, a shaft journaled in said stationary member and movable longitudinally, a rotatable member fixed to said shaft and in pressure sealing contact with said seat, a collar abutting the opposite end of said stationary member and provided with a beveled face, and arms carried by said shaft and having bearing portions operable over said beveled face to move said shaft longitudinally to increase the sealing pressure between said members.

4. A device of the class described comprising a stationary bearing member, a shaft journaled therein and movable longitudinally relative thereto, a rotatable member fixed to said shaft and in sealing engagement with one end of said stationary member, a collar loosely arranged on said shaft and abutting the opposite end of said stationary member, and arms pivotally carried by said shaft and engageable with said collar for displacing said shaft and increasing the sealing pressure between said members.

5. In a device of the class described, the combination with a housing, of a stationary bearing member arranged therein, a shaft journaled in said bearing and movable relative thereto, a rotatable member fixed to said shaft and having a frictional sealing contact with one end of said bearing, a support fixed to said shaft and rotatable therewith, arms pivotally mounted on said support and operable by centrifugal action, and a collar loosely arranged on said shaft and interposed between the opposite end of said bearing member and said support and engageable by said arms whereby said shaft is displaced longitudinally for increasing the sealing pressure between the contacting faces of said members.

6. In a device of the class described, the combination of a revoluble shaft, a stationary bearing member therefor, said bearing being provided at one end with a concave seat, a member fixed to said shaft and rotatable therewith, said member having a convex face engaging said seat for forming a fluid tight seal, and means carried by said shaft and yieldingly held against said bearing for increasing the sealing pressure with which said rotatable member is applied to said bearing when said shaft is stationary, said means being centrifugally operable to move out of engagement with said bearing and remove this auxiliary pressure when said shaft is rotated.

7. In a compressor, the combination with the actuating shaft thereof, of a stationary bearing provided at one end with a seat, a member fixed to said shaft and in sealing pressure engagement with said seat for forming a fluid tight joint, a coiled spring for holding said member to said seat at all times, and centrifugal means for automatically varying the sealing pressure between said bearing and said member, said means being spring actuated to increase the sealing pressure when said shaft is stationary and being centrifugally operable to overcome this spring action and remove the auxiliary sealing pressure when said shaft is rotated at a predetermined speed.

8. A seal for refrigeration machines comprising in combination with the driving shaft of said machine, of a stationary member cooperating with said shaft, a rotatable member carried by said shaft and in sealing pressure engagement with said stationary member said members having their contiguous faces arranged in sealing contact with each other, and centrifugally operable means movable by centrifugal action into extended releasing position and yieldingly held in retracted positions for increasing the sealing pressure between said members when said means are not actuated, and a coiled spring for maintaining a normal sealing pressure between said members at all times.

9. In a seal for refrigerating apparatus, the combination with a housing therefor, of a bearing secured in said housing, a washer arranged adjacent to one end of said bearing and having a convex face, a shaft journaled in said bearing and projecting outwardly from said housing, a seal member fixed on said shaft and in sealing contact with the opposite end of said bearing, a coiled spring for maintaining said seal member under normal pressure contact with said bearing, a centrifugally operable arm carried by said shaft, a spring for yieldingly holding said arm in retracted position, said arm when in retracted position being in engagement with said convex face of said washer, thereby subjecting the shaft when stationary to longitudinal pull to increase the pressure between said seal member and said bearing, said arm being operable by centrifugal action into a releasing position to remove this auxiliary pressure from said seal member when said shaft is actuated at a predetermined speed.

10. A shaft seal comprising a stationary seal member, a shaft journaled in said stationary member, a rotatable seal member fixed to said shaft and in sealing contact with the first member, a coiled spring for maintaining at all times said seal members under normal sealing pressure, a pair of weighted arms pivotally carried by said shaft and operable when in retracted positions to exert a longitudinal pull on said shaft to increase the sealing pressure between said seal members, and a pair of coiled springs connected to said weighted arms for holding said arms in retracted positions when said shaft is stationary, said springs being yieldable to allow outward movement of said arms by centrifugal action when said shaft is rotated at a predetermined speed, thereby releasing said seal members of the auxiliary pressure during the rotation of said shaft.

In testimony whereof I hereunto affix my signature this 21st day of May, 1925.

JOHN O. CARREY.